United States Patent
Blankenship et al.

(10) Patent No.: US 6,552,303 B1
(45) Date of Patent: Apr. 22, 2003

(54) SYSTEM FOR ENABLING ARC WELDERS

(75) Inventors: George D. Blankenship, Chardon, OH (US); Edward D. Hillen, Painesville, OH (US); William S. Houston, Avon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 70 days.

(21) Appl. No.: 09/866,360

(22) Filed: May 29, 2001

(51) Int. Cl.⁷ .............................................. B23K 9/095
(52) U.S. Cl. ................................................... 219/130.5
(58) Field of Search ........................ 219/130.5, 124.34, 219/125.1, 125.11, 130.01; 228/103; 901/42

(56) References Cited

U.S. PATENT DOCUMENTS

| | | |
|---|---|---|
| 3,581,050 A | 5/1971 | Brown et al. |
| 3,581,051 A | 5/1971 | Brown |
| 3,689,734 A * | 9/1972 | Burley et al. ............. 219/130.5 |
| 4,000,374 A | 12/1976 | De Keyser |
| 4,144,992 A * | 3/1979 | Omae et al. ........... 219/125.11 |
| 4,415,792 A | 11/1983 | Jordan |
| 4,527,045 A | 7/1985 | Nakajima et al. |
| 4,587,407 A | 5/1986 | Ahmed et al. |
| 4,608,482 A | 8/1986 | Cox et al. |
| 4,721,947 A * | 1/1988 | Brown ....................... 228/103 |
| 4,767,913 A | 8/1988 | Weber et al. |
| 4,791,284 A | 12/1988 | Ludden |
| 4,879,457 A | 11/1989 | Ludden |
| 4,960,983 A | 10/1990 | Inoue |
| 4,976,179 A | 12/1990 | Lacrouts-Cazenave |
| 5,151,684 A | 9/1992 | Johnsen |
| 5,278,390 A | 1/1994 | Blankenship |
| 5,481,100 A | 1/1996 | Terauchi |
| 5,497,140 A | 3/1996 | Tuttle |
| 5,500,512 A | 3/1996 | Goldblatt |
| 5,553,810 A | 9/1996 | Bobeczko |
| 5,571,431 A * | 11/1996 | Lantieri et al. ........ 219/130.01 |
| 5,583,819 A | 12/1996 | Roesner et al. |
| 5,692,700 A | 12/1997 | Bobeczko |
| 5,708,253 A | 1/1998 | Bloch et al. |
| 5,862,071 A | 1/1999 | Scholder |
| 5,981,906 A | 11/1999 | Parker |
| 6,002,104 A | 12/1999 | Hsu |
| 6,091,048 A | 7/2000 | Lanouette et al. |
| 6,096,994 A * | 8/2000 | Handa et al. ............. 219/130.5 |
| 6,107,601 A * | 8/2000 | Shimogama ............. 219/130.5 |

OTHER PUBLICATIONS

D.K. Miller; "What Every Engineer Should Know About Welding Procedures"; article Published in *The National Steel Construction Conference Proceedings*, Chicago, AISC, 1997.

Publication of Motorola, "BISTATIX™ A Breakthrough Solution for Automated Data Capture", undated, 6 pages.

Publication of Motorola, "Indala Industrial Products", dated 1998, 8 pages.

(List continued on next page.)

Primary Examiner—Clifford C. Shaw
(74) Attorney, Agent, or Firm—Fay, Sharpe, Fagan, Minnich & McKee

(57) ABSTRACT

A system for enabling an electric arc welder adapted to perform various welding processes using weld parameters and a welding wire. The system comprises a first receptacle for a first memory button having a chip loaded with digital data indicative of a specific welding procedure specification constituting a set of at least weld parameters, a specific weld process, electrical characteristics, and selected welding wire features; a second receptacle for a second memory button having a chip loaded with digital data indicative of recorded features of welding wire loaded onto the welder; and, a disable circuit to disable the welder to process the specific welding procedure when the data indicative of recorded features of the welding wire fails to correspond with the data indicative of the selected welding wire features.

61 Claims, 7 Drawing Sheets

OTHER PUBLICATIONS

Publication of Motorola, "Electro–Magnetic RFID: Everything You Need to Know About Inductively Coupled RFID", dated Rev. Apr. 8, 1999, 20 pages.

Publication of Texas Instruments, "TIRIS™ Radio Frequency Identification Solutions—Linking Ideas, Information and Solutions", undated, 8 pages.

Publication of Dallas Semiconductor Corporation, "50 Ways to Touch Memory", dated Aug. 1994 Third Edition, 92 pages.

* cited by examiner

SYSTEM FOR ENABLING ARC WELDERS

The invention relates to the art of electric arc welding and more particularly to a system for loading an electric arc welder with a welding procedure specification and then enabling the welder when conditions are proper to execute the selected welding procedure specification WPS.

INCORPORATION BY REFERENCE

In the welding industry, the welding of critical applications involves experimental optimization of many parameters and weld controlling factors into an acceptable weld procedure. This procedure is generally referred to as the welding procedure specification (WPS) which is well known in the art of electric arc welding and is generally described in a 1997 article by D. K. Miller entitled *What Every Engineer Should Know about Welding Procedures*. A reprint of this article is incorporated by reference herein to describe the general content and application of a WPS so this material need not be repeated. Bloch U.S. Pat. No. 5,708,253 suggests the concept of loading the welding procedure specification into the controller of an electric arc welder and then modifying the various parameters. The data causes a central control microprocessor to implement the parameters during a welding operation. This fixed programmed use of welding procedures is known. The Bloch patent is incorporated by reference to illustrate background information. In the present invention, data is introduced into the control logic network by memory chips of the type available from Dallas Semiconductor Corporation of Dallas, Tex., under the trademark "Touch Memory." These electronic memory buttons store digital data in an internal READ/WRITE chip which data is transmitted upon command from the button to an interface communicated with said control logic network. In the present invention, the interface is communicated with the button by way of a receiving receptacle. Any of many known button receiving receptacles can be used. One receptacle is disclosed in Scholder U.S. Pat. No. 5,862,071, which patent is incorporated by reference to show one of many memory chip receptacles.

Assignor has a pending U.S. application Ser. No. 336,574 filed on Jun. 21, 1999 and disclosing the concept of memory chips for receiving data and transmitting data to the controller of an electric arc welder by touching of the support structure for the chip. This prior application is incorporated by reference herein as further background information regarding the technique of employing touch interrogated memory chips for receiving and transmitting data from and to the digital processing controller of an electric arc welder.

BACKGROUND OF INVENTION

In electric arc welding as described in Bloch U.S. Pat. No. 5,708,253, repeatable quality in electric arc welding for specific applications requires that the procedure used in the welding process be the same or within certain constraints. In addition, the weldor or operator assigned to execute the procedure must be qualified to perform the specific welding operation by a prior testing and prior actual experience. Furthermore, even a weldor qualified for a specific procedure can lose the specific skill required after long periods without actually performing the welding operation. Consequently, qualification of the operator should be assured so the welding operation can meet the standard necessary for acceptance of the welding result. In addition, it is necessary that the parameters involved in the welding procedure specification be met during the welding operation.

In the past, the welding procedure was manually loaded into the digital process controller of the electric arc welder by various interfaces connected to the controller. In addition, items of the WPS, such as wire feed speed, wire specification, shielding gas, preheat, impass heat, post heat, etc., were set according to written or stored criteria constituting the welding procedure specification. Implementing this technique, together with assuring qualification of the operator presented difficulties. The welding by the weldor was performed irrespective of compliance with the various parameters constituting the welding procedure specification and irrespective of the actual qualification of the weldor performing the welding operation. Consequently, detailed record keeping and checking of the various parameters preparatory to the welding operation were necessary, but quite complex. When it was determined that the welding procedure was not followed or the operator was not adequately qualified, the resulting welding operation was rejected or required subsequent remedial processing. Consequently, a procedure to assure proper welding to a detailed specification was complicated and expensive. It required a substantial amount of record keeping and historical maintenance of data associated with the many welds performed in the field.

Goldblatt U.S. Pat. No. 5,500,512 and Bobeczko U.S. Pat. No. 5,553,810 disclose bar codes on a wire reel to be read when the reel is loaded onto a welder. A process sheet is also read by a bar code to correlate with the wire. These patents are incorporated by reference as background technology.

THE INVENTION

In electric arc welding, specific applications often involve a welding procedure specification WPS that must be followed for acceptance of the weld. In practice, the WPS for a specific application provides the necessary information to set the electric arc welder and load the electric arc welder with external constituents for the purposes of performing the specified welding process. In accordance with the present invention, the WPS for a given welding operation is converted to digital data and stored either in a IC chip of a memory button or in a remote location such as a computer connected to the welder by an ethernet network. Such network is local or by the internet. WPS is directed to the controller of the electric arc welder. In the preferred embodiment of the invention the digital data comprising the WPS of a specific welding operation is loaded into the IC chip of a memory button. As an alternative, the memory button includes a code which will allow the digital data defining the WPS to be directed to the digital process controller of the welder. This can be from a memory or from an ethernet network. Thus, the present invention involves a memory button containing a specific digital data defining WPS or a code identifying a specific WPS. As an alternative, the digital data defining the WPS is loaded directly into the controller from an external source, such as an ethernet network.

In the preferred implementation, a memory button is connected to receptacle in a touch connector coupled to the controller of the welder. Consequently, by merely placing the memory button into a receptacle on the touch connector associated with a specific welder, the welding procedure to be performed by the welder is directed by process logic to the controller of the welder. The controller upon receiving the selected procedure is disabled unless the various items of the WPS are available on the welder or used by the welder. To assure the proper wire, gas, and operator, the touch connector includes additional receptacles for memory buttons, each of which contain an IC chip loaded with the necessary data associated with a particular aspect of the welding process. In practice, the WPS memory button is attached to one receptacle of the touch connector. Another receptacle receives a memory button with a chip containing the qualifications of the particular operator destined to perform the welding procedure. If the welding procedure loaded into the controller contains qualifications for the person performing the operation, then the button containing the weldor qualifications allows activation of the welder if the person has at least the qualifications necessary for performing the specified WPS. In a like manner, another receptacle on the touch connector receives a touch memory button having a chip loaded with the information on the welding wire or electrode, such as material, specification, diameter, etc. Data contained on the chip of this memory button is compared to the data indicative of the welding wire or electrode from the memory chip for the WPS to not disable the welder. In this way, the welding operation is performed with the proper welding wire or electrode. Another memory button includes a chip loaded with the identification of the shielding gas. When this chip is received in a receptacle on the touch connector, the shielding gas connected to the welder is determined. If the shielding gas is not proper, the welder is disabled. In accordance with implementation of the invention, the touch connector can have additional receptacles for additional memory buttons having chips with data corresponding to a feature or item in the welding procedure specification.

By using the present invention, a work order carries a button including the data indicative of the parameters of the welding procedure specification of a specific welding operation. The wire or electrode bundle for the welder carries another memory button which is removed from the wire or electrode and placed in a receptacle on the touch connector. In a like manner, the welding gas carries a button which is detached and inserted into another receptacle on the touch connector. Likewise, the operator possesses an identification memory button to be mounted in a designated receptacle on the touch connector. If all of these buttons in the touch connector conform, then the welder is not disabled. However, the welder itself must be capable of performing the selected welding operation. Consequently, the controller itself will output information of the type of welder to assure that the WPS can be performed. When all of these items match, the welding process can be performed. By merely inserting a plurality of buttons indicative of welding items, the welder is commissioned for performing a specific welding operation, which preferably is also inputted by a memory button.

In accordance with the present invention there is provided a system for enabling an electric arc welder adapted to perform various welding processes using weld parameters and a welding wire. The system comprises a first receptacle for a first memory button having a chip loaded with digital data indicative of a specific welding procedure specification. The specification comprises a set of at least weld parameters, a specific weld process, electrical characteristics, and selected welding wire or electrode features. The procedure dictates the operating characteristics of the welder during the welding process. A second receptacle for a second memory button having a chip loaded with digital data indicative of recorded feature of the wire or electrode to be used by the welder. The system includes a disabled circuit or logic to disable the welder to process the specific welding procedure when the data indicative of the features of the welding wire fail to correspond with the data indicative of the selected welding wire or electrode features. Thus, if the desired wire or electrode identified by the second button is not the proper wire or electrode for the welding procedure, the welder will not be enabled.

In accordance with another aspect of the invention, the electrical characteristics or other aspects of the welding procedure specification relating to the capabilities of the welder will be compared by the process logic in or before the controller of the welder to determine if the welder is capable of performing the selected welding procedure. Consequently, both a series of individually placed buttons and the capabilities of the welder are compared with the loaded welding procedure specification to allow the execution of the welding process.

In accordance with another aspect of the invention, the first chip associated with the first memory button includes digital data defining a selected qualification of the operating weldor or operator so a third receptacle can receive a third memory button having a chip loaded with digital data indicative of the actual welding qualification of a weldor. A disabled circuit disables the welder to process the welding procedure specification when the actual welding qualification fails to match or exceed the selected qualification. In accordance with this concept, the third memory button can be a READ/WRITE memory wherein the qualification information is updated according to the specification being processed. The term "weldor" indicates the person conducting the welding process and the term "welder" is the actual apparatus performing the process.

In accordance with another aspect of the present invention there is provided a system for enabling an electric arc welder adapted to perform various welding processes using weld parameters and a welding wire. The system comprises a first receptacle for a first memory button having a chip loaded with digital data indicative of a specific welding procedure specification and constituting a set of at least weld parameters, a specific weld process, electrical characteristics, and selected welding wire features. A second receptacle for a second memory button having a chip loaded with digital data indicative of an item in the set; and, a disable circuit to disable the welder when the data indicative of the item fails to correspond with the data indicative of the item.

In yet another aspect of the invention, there is provided a system for enabling an electric arc welder adapted to perform various welding processes using weld parameters and a welding wire. The system comprises a first receptacle for a first memory button having a chip loaded with digital data indicative of a specific welding procedure specification and a selected qualification of the operating weldor. A second receptacle for a second memory button having a chip loaded with digital data indicative of the actual qualifications of a specific weldor or operator and a disable circuit to disable the welder to process the specific welding procedure when data indicative of the actual qualifications fail to match or exceed the selected qualifications.

Still a further aspect of the invention is the provision of a system for enabling an electric arc welder adapted to perform various welding processes using weld parameter and a welding wire or electrode. This system comprises a first receptacle for a first memory button having a chip loaded with digital data indicative of a specific welding procedure specification constituting a set of at least weld parameters, a specific weld process, electrical characteristics and selected welding wire features. This aspect of the invention includes a circuit to load the welding procedure specification into the controller of the welder to set characteristics of the welder. The controller is the digital processing device used by welders and can be input logic or another input network.

In accordance with another aspect of the present invention there is provided a system for controlling an electric arc welder at a weld station, such as a robot. The system comprises a controller for the power supply and for external drives at the weld station. These drives include wire feeders and robot drives controlling travel speed during the weld, to name a couple. The controller has a digital processing device with a section for receiving digital data and for controlling the welder in compliance with the digital data. In this aspect of the invention, the data includes a selected value for an external weld condition, such as arc current or arc voltage of the power supply and wire feed speed and travel speed for the drive units. A data entry station is used by the operator to select a set level for one of the external conditions. A logic network compares the selected level and the selected value to create an action signal based upon this comparison. The digital data is a selected welding procedure specification. In one aspect, the action signal causes the controller to either decrease or increase the set level. As an alternative, if the set level is not within prescribed limits, the welder is disabled. Thus, an operator selecting the wrong level for an external condition can cause the welder to be disabled. As a further aspect, the action signal causes the external condition to be recorded during the welding operation. This response to an action signal can be used with other responses. The action signal can also merely transmit the selected set level to the power supply and to the external drive devices, if the set level does not deviate beyond a certain amount from the data relating to the external condition as contained in the welding procedure specification. In this manner, the external conditions such as wire feed speed, travel speed, arc current and arc voltage are processed in accordance with the welding procedure specification, either to set the command signals for the external condition or to disable the welder from performing the welding process.

A further aspect of the present invention is the provision of a system for controlling an electric arc welder performing a welding operation at a weld station, such as a robot. The system comprises a controller for the power supply of the welder. The controller has a digital processing device with a memory for receiving digital data and a for controlling the welder in compliance with the digital data. A reading device loads control data containing a specific welding procedure specification into the memory. The control data includes a selected level for an external condition. The controller generates a command signal for the external condition. A sensor reads the actual external condition on a real time basis while a comparison circuit disables the welder when the external condition deviates from the selected set level. In this manner, an external condition is compared to the selected set condition as contained in a welding procedure specification and the welder is disabled when the actual external condition deviates from the level in the welding procedure specification.

Still a further aspect of the present invention is the provision of a method for controlling an electric arc welder having a power supply, external drives and a controller for the power supply and drives. The method comprises loading digital data containing a specific welding procedure specification and including a selected value for an external condition. Thereafter, a desired level for an external condition is inputted into the controller and is compared to the value to create a command signal used by the power supply or external drives. A modification of this method involves the real time value of the external condition and disabling the welder when the real time value deviates from the command signal by a selected amount.

In accordance with an aspect of the invention the digital data is stored on the chip of the individual memory buttons; however, in accordance with an aspect of the invention the memory buttons are merely loaded with a code. This code inputs digital information from either an ethernet network or a memory in the controller for providing the digital data to be compared preparatory to enabling the welder to perform the welding process.

The primary object of the present invention is the provision of A system for operating an electric arc welder, which system employs a series of manually insertion memory buttons to input the welding process to be performed, together with various external welding considerations such as wire, gas, prior heat, and weldor qualifications. By inputting this information, the weldor is disqualified from performing the welding process unless the digital data matches to allow operation of the welder.

Another object of the present invention is the provision of a system, as defined above, which system employs a series of manually insertable memory chips to enable a welder to perform a welding process defined by a specific welding procedure specification. The specification can be inserted or loaded by any technique, including, but not limited to, a memory button.

Still a further object of the present invention is the provision of a system, as defined above, which system prevents the welder from operating unless the person operating the welder has certain qualifications. In accordance with another object, the qualifications are updated after each welding process to produce a personal history of the operator performing the welding process.

Still a further object of the present invention is the provision of a system, as defined above, which system has an individual button containing data or capable of inputting data indicative of the welding wire characteristics so the welder will perform the welding procedure only if a proper wire or electrode is being used. In a like manner, a memory chip can be employed which contains data indicative of other external items, such as shielding gas or temperature so the welder will not operate unless the desired external item is employed with the welder. In sensing temperature, a touch probe is normally used. The workpiece coming to the weld station, such as a robot, may require preheating. In that case, a touch probe reads the preheat temperature. In a like manner, the temperature of a bead laid in a multipass weld is sensed to determine interpass temperature.

These and other objects and advantages will become apparent from the following description taken together with the accompanying drawings.

BRIEF DESCRIPTION OF DRAWINGS

Referring now to the drawings wherein the showings are for the purpose of illustrating embodiments of the invention only and not for the purpose of limiting same, FIG. 1 is a schematic illustration of the invention. System 10 is used to provide control data by line 12 to determine the operation of welder A by controller 20. The controller is a standard digital processing device for outputting command signals on line 22 to govern the operation of power supply 30, shown as having positive terminal 32 and negative terminal 34. Of course, these terminals can be from a switching network with alternate polarity or can be from a rectifier to give specific polarity for AC, DC positive, or DC negative welding. Power supply 30 is not part of the invention and can be an inverter, down chopper, or other power source architecture. Welder A performs a welding operation at a station schematically illustrated as contact sleeve 40 for directing current to welding wire or electrode E from supply spool 50 toward workpiece W. In some instances, a stick electrode may be used. Controller 20 causes welder A to perform any of a variety of welding processes involving weld parameters ($I_a$, $V_a$, WFS), electrical characteristics (AC, DC+, DC−), and other definitions of the welding mode (pulse, spray, globular, short circuit, STT). System 10 includes touch connector 60 in the form of a strip having a series of receptacles for memory buttons. Each button has an internal chip loaded with digital data. Touch connector 60 is shown with several receptacles 62–66 for receiving memory buttons 100–106, respectively. The internal digital chip of each button is loaded with digital information indicative of certain parameters, as will be explained. Receptacle 62 is located on touch connector 60 even though it is shown separated because of certain intermediate logic processing circuits or programs. Button 100 has a chip that contains digital information indicative of the welding procedure specification WPS. When the button 100 is inserted into receptacle 62, the information on the internal chip is stored in device 90 for outputting into system 10. A tag 100a indicates the particular WPS carried by button 100. System 10 includes a disabling circuit 110 which will not allow controller 20 to operate unless an enable output is received from the disabling circuit. To explain the operation of the disabling circuit, logic gates 130 are shown with inputs 112–116 from storage device or memory 90. The welding procedure specification on the chip of button 100 dictates the parameters of welder A, as well as controls disabling circuit 110. The circuits are software implemented, but are shown in hardware format for explanation.

Figure 1:
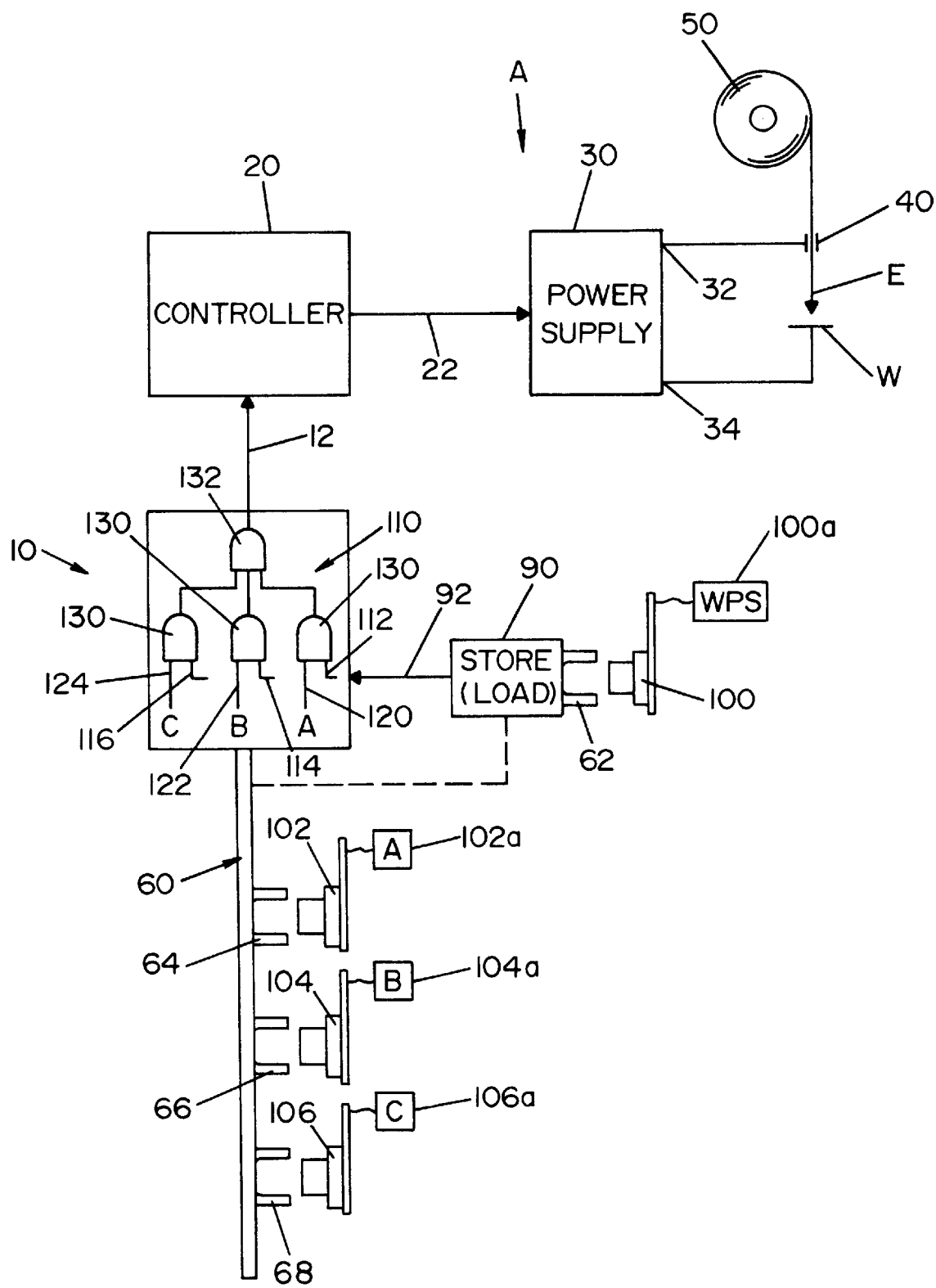
FIG. 1 is a schematic block diagram illustrating the present invention.

Button 102 in receptacle 64 has a chip with data relating to an external item used in welding. In practice, the chip of button 102 contains digital data indicative of the wire E on spool 50. This data is compared with the data on line 112 from button 100. In a like manner, button 104 contains data relating to the gas used for shielding the welding process. This data is directed to line 122 for comparison with the data indicated as line 114 from button 100. The qualification of the person operating welder A is stored in the chip on button 106. This chip provides weldor qualification on line 124 for comparison to the qualifications desired as contained in the data on line 116. The use of lines and gates explains the operation of the software used to implement the invention.

Tags 102a, 104a and 106a are for identification of the items on the chip. For instance, tag 102a is sent with a spool of wire E. When the spool is loaded onto the welder, the tag is separate so its button 102 can be inserted into receptacle 64. Tag 104a is removed from the gas supply cylinder, while tag 106 is carried by the person to do the welding. When all the buttons identified by the tags are inserted into touch connector 60, the welding procedure specification is inputted to controller 20 and the individual aspects of the WPS are compared from buttons 102–106 by circuit 110. If there is coincidence of data between the desired operation of the welding procedure specification and the information on buttons 102–106, an enable signal is directed to the controller 20 through line 12. This line also inputs other information relating to the WPS to be performed by welder A. This data bypasses the disable circuit 110. Welder A is controlled by parameters from the WPS. If welder A is not capable of performing the desired parameters loaded into memory button 100, controller 20 does not initiate welding. The invention does not relate to the secondary discrimination feature.

By merely inserting buttons 100–106 into the touch connector, the process to be performed by welder A is selected and system 10 assures that the proper wire or electrode, shielding gas and operator are brought together for the purposes of successful welding. System 10 primarily relates to the coordination of buttons 100–106; however, when the other parameters of the WPS are inputted into controller 20, the controller also determines whether welder A can perform the desired welding operation. Thus, by merely using a series of buttons inserted into a touch connector, welder A is set to perform the desired welding operation and is enabled when the desired coincidence are realized by the buttons 100–106. Of course, the disable circuit is illustrated in logic form; however, it is performed by a microprocessor in digital program language.

Figure 2:
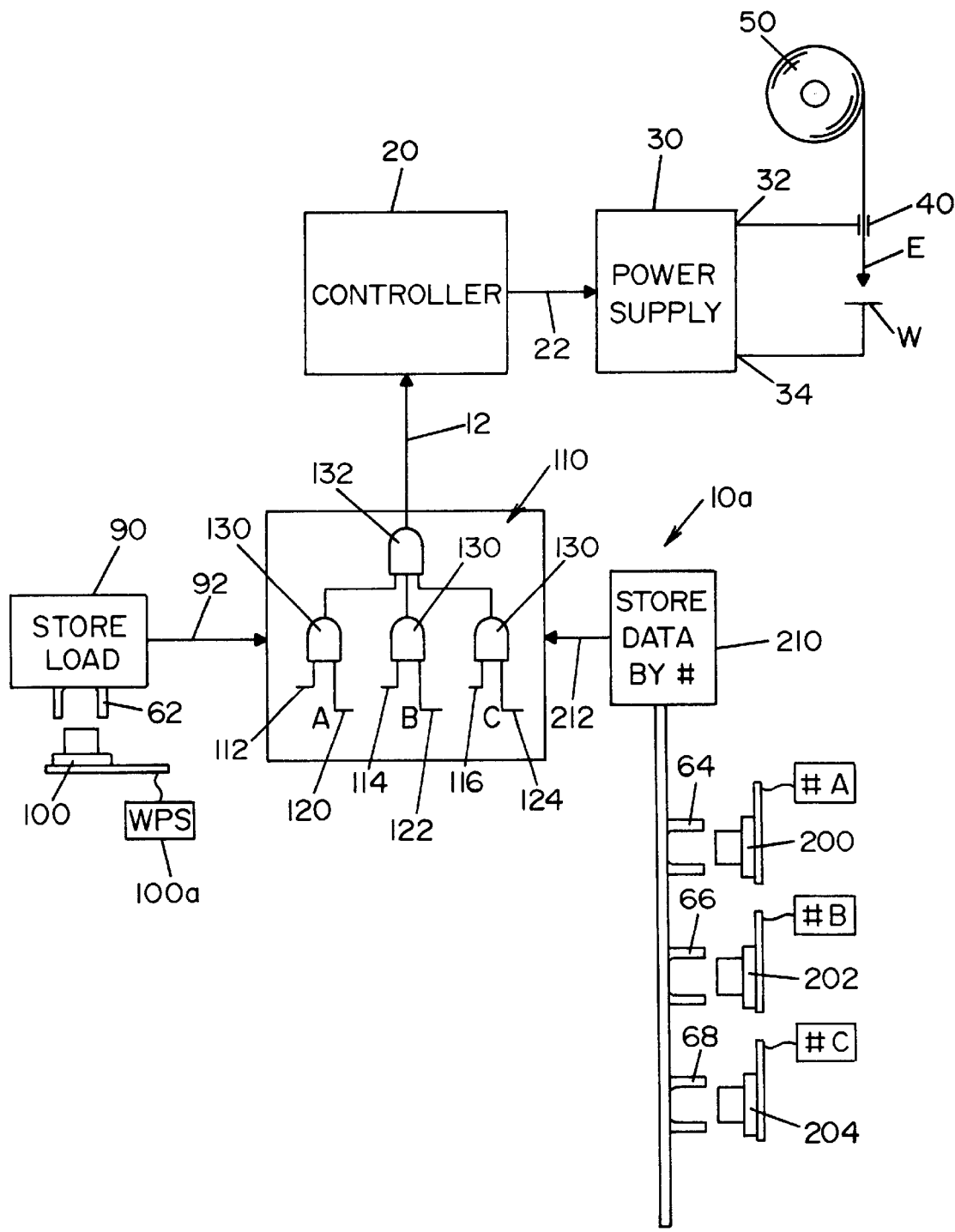
FIG. 2 is a schematic block diagram of a modification of the illustration in FIG. 1.

System 10a shown in FIG. 2 is a slight modification of the system 10 in FIG. 1. The welding procedure specification loaded into the chip of memory button 100 is again received by receptacle 62 to load the desired digital information in memory 90 for outputting as represented by line 92. This information is directed through line 12 into controller 20, except for the portion to be compared by disabling circuit 110 with the information to be directed by system 10a through receptacles 64–68. Disabling circuit 110 has logic gates 130 with first inputs 112–116 from the data on the chip of button 100. In this system, buttons 200, 202, 204 correspond to the items of buttons 102, 104, 106, respectively, of FIG. 1. However, the digital data on the chips within these buttons merely include an identification code. These codes activate the memory 210 to output the actual digital information corresponding to the stored information on buttons 102–104 into circuit 110. The coded information on button 100 causes memory device 210 to output digital information indicative of the welding wire or electrode E on line 120. In a like manner, the code on the chip of button 102 causes memory device 210 to output the necessary information regarding the shielding gas on line 122. The qualifications of the operator can be identified by a code in the chip of memory button 204. However, in practice, it has been found difficult to store qualifications at the welder; therefore, in practice, buttons 200, 202 are provided with identification codes for the wire and shielding gas. Actual qualification code is contained in the chip of button 204 for comparison with the desired qualifications of an operator to perform the specific welding process stored in the chip of button 100. The embodiment of FIG. 2 is only a modification of the system 10 to allow the use of identifying codes for memory addresses as opposed to the actual digital information. In any event, the invention uses a memory button so data is compared to the requirement of the welding procedure specification. Preferably, the WPS is on the chip of a memory button.

Figure 3:
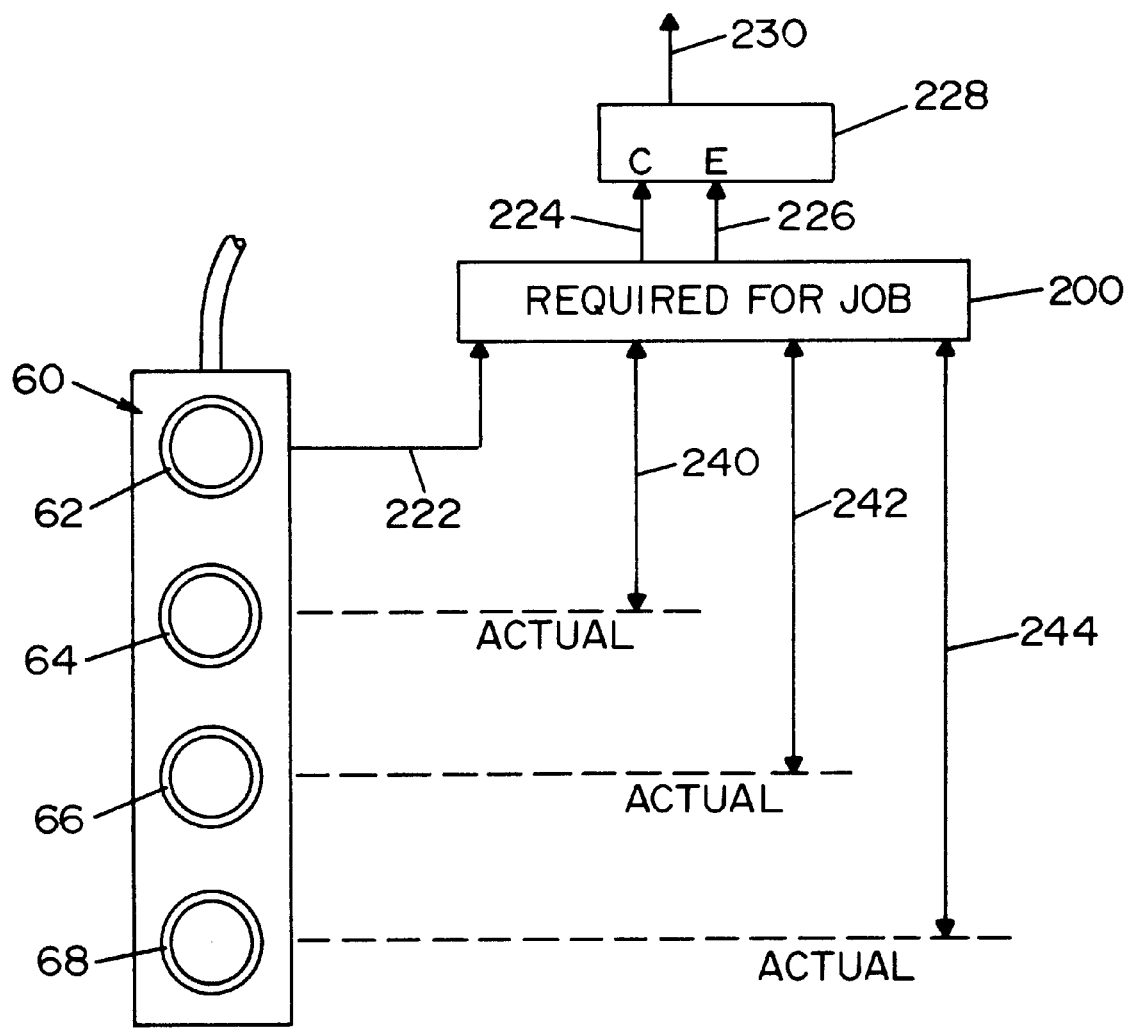
FIG. 3 is a front view of the touch connector with receptacles and a schematic diagram of an operation of features of the invention.

In FIG. 3, a schematic layout of touch connector 60 is illustrated with its receptacles 62–68. The welding procedure specification is outputted through line 222 into a pass-through and discriminating circuit 220. Parameters for the welding process are passed through circuit 220 as indicated by line 224 for storage in register 228. This information is communicated by line 230 to controller 20 to govern operation of welder A. In the meantime, the enable line 226 is disabled whenever the information on lines 240, 242 or 244 is not consistent with the corresponding digital data on line 222. Consequently, data on line 230 includes the weld parameters, as well as the enable signal for welder A so it can perform the desired welding procedure specification contained on the chip of button 100. Again, the line drawing depicts software implementation. FIGS. 1–3 are schematic representations of the basic concept used in the invention. A series of receptacles receive digital information from memory buttons to program a welder for performance of a specific welding procedure specification. In doing so, certain externally controlled items or additions are required, such as wire or electrode, shielding gas and an operator. Additional memory buttons are used to input digital information regarding such items or additions to prevent operation of welder A, except in accordance with the preselected WPS.

Figure 4:
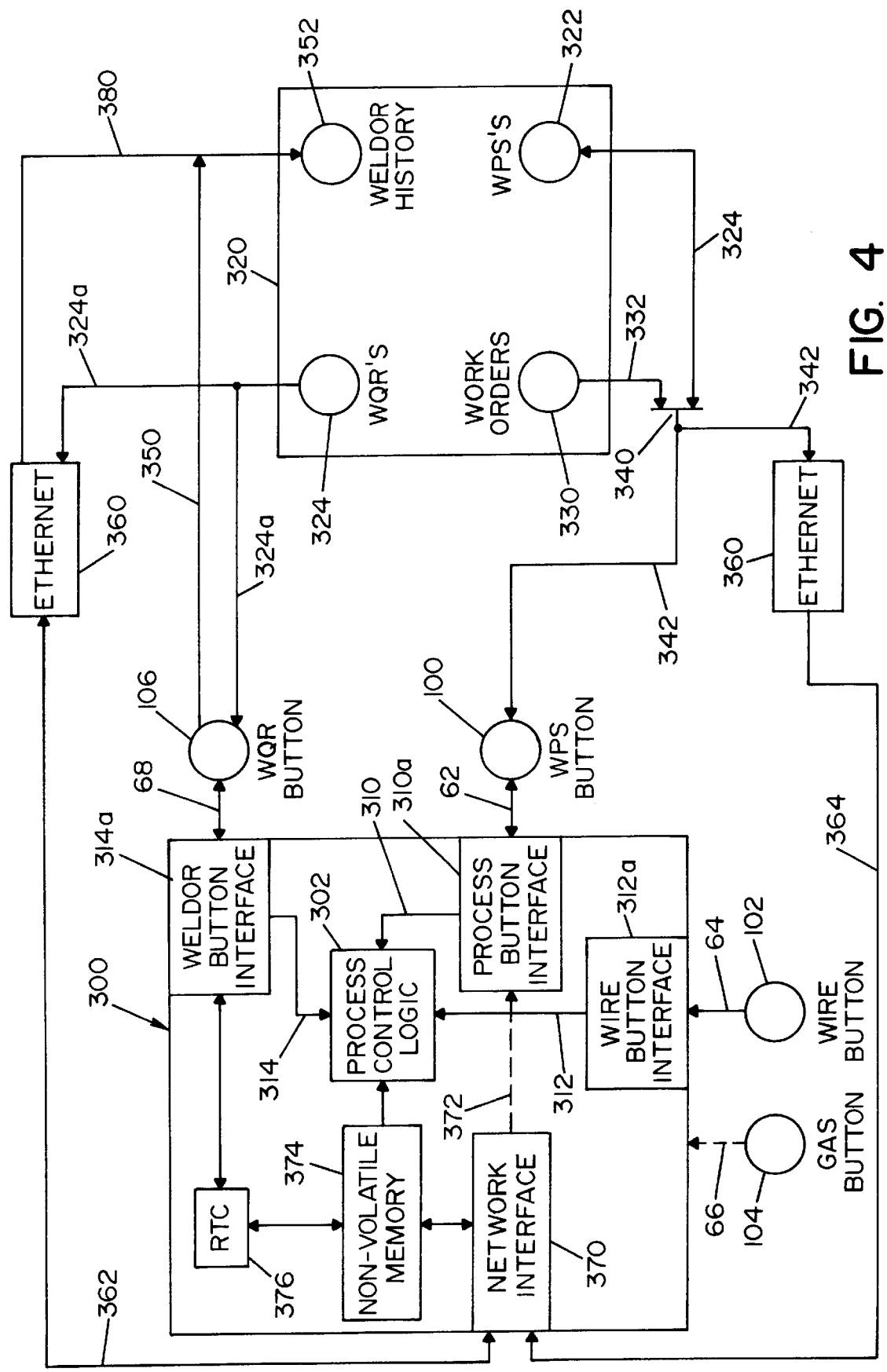
FIG. 4 is a block diagram and wiring diagram of the preferred embodiment of the invention.

The proposed commercial implementation of the present invention is set forth in FIG. 4. Controller 300 of welder A has input logic so data can be inputted from buttons 100, 102 and 104 in receptacles 62–68, respectively, of touch connector 60. This data is processed by process control logic 302 that receives the digital data as indicated by lines 310, 312, and 314 from interfaces 310a, 312a and 314a, respectively. These interfaces convert the digital data from the chip carried by the buttons for use by process control logic 302. As so far described, buttons 100 and 106 are inserted into receptacles 62 and 68, respectively, to direct digital data into process control logic 302. This control logic performs the operations as explained in association with the schematic representations in FIGS. 1–3. In practice, buttons 100, 106 are loaded and buttons 102, 104 are carried by the welding consumables, i.e. wire and gas. As shown in FIG. 4, buttons 100, 102 can be loaded by a web server or computer 320 that stores the many weld procedure specifications in memory 322 and the qualification of the many operators in memory 324. To load the digital data to the chip on button 100, a work order selector 330 in computer 320 directs logic by line 332. This logic is compared with the welding procedure specifications in memory 322 available on line 324. The specific work order selects the desired WPS from line 324 by address device 340. The WPS is then outputted on line 342. This digital data is used to program the chip of button 100. In a like manner, button 106 is programmed by the data on line 324a from memory 324. Of course, the buttons are programmed and then used on touch connector attached to and communicating with controller 300. During the welding process, the fact that a specific process has been performed is outputted to the WRITE portion of the READ/WRITE chip of button 106. Therefore, the fact that the operator performed a specific welding procedure on a specific date is recorded in the chip of button 106. This information is then transmitted to computer or web server 320. This is done by connecting button 106 to line 350. This line is not part of the button carried by a proposed operator. The update of memory 324 is normally done by bringing the button back to the computer or web server. This new information is then stored in memory 352 which stores the history of the various persons performing welding operations. Computer 320 uses the new information to update data in memory 324. Lines 324a, 342 and 350 are not permanently connected to buttons 100, 106. They are representative in nature as transmitting of information back and forth from the computer to the button for programming or updating.

Control of the information on buttons 100, 106 can be directly introduced into controller 300 through an ethernet network 360. In this instance, data on line 324a is communicated through line 362 and the data on line 342 is communicated through line 364. These lines are interfaced by network 370 with the process button interface 310a. Thus, the welding procedure specification WPS is loaded into process control logic 302 through network interface 370, as indicated by dashed line 372. The particular operator qualification and identification is directed from line 362 into the non-volatile memory 374 where a real time clock 376 dates and time codes the information for updating qualifications of the specific operator. The updated information is transmitted back through line 362 and ethernet network 360 to line 380, corresponding with feedback line 350. Thus, data normally inserted by buttons 100, 106 is processed by the internet, a local ethernet network or by the buttons. Consumables, such as wire and gas, are always inputted to process control logic 302 by memory buttons 102, 104. Other variations of button or ethernet communication can be made without departing from the intended spirit and scope of the invention. However, the invention relates to the use of memory buttons for identifying such items as wire and gas.

Figure 5:
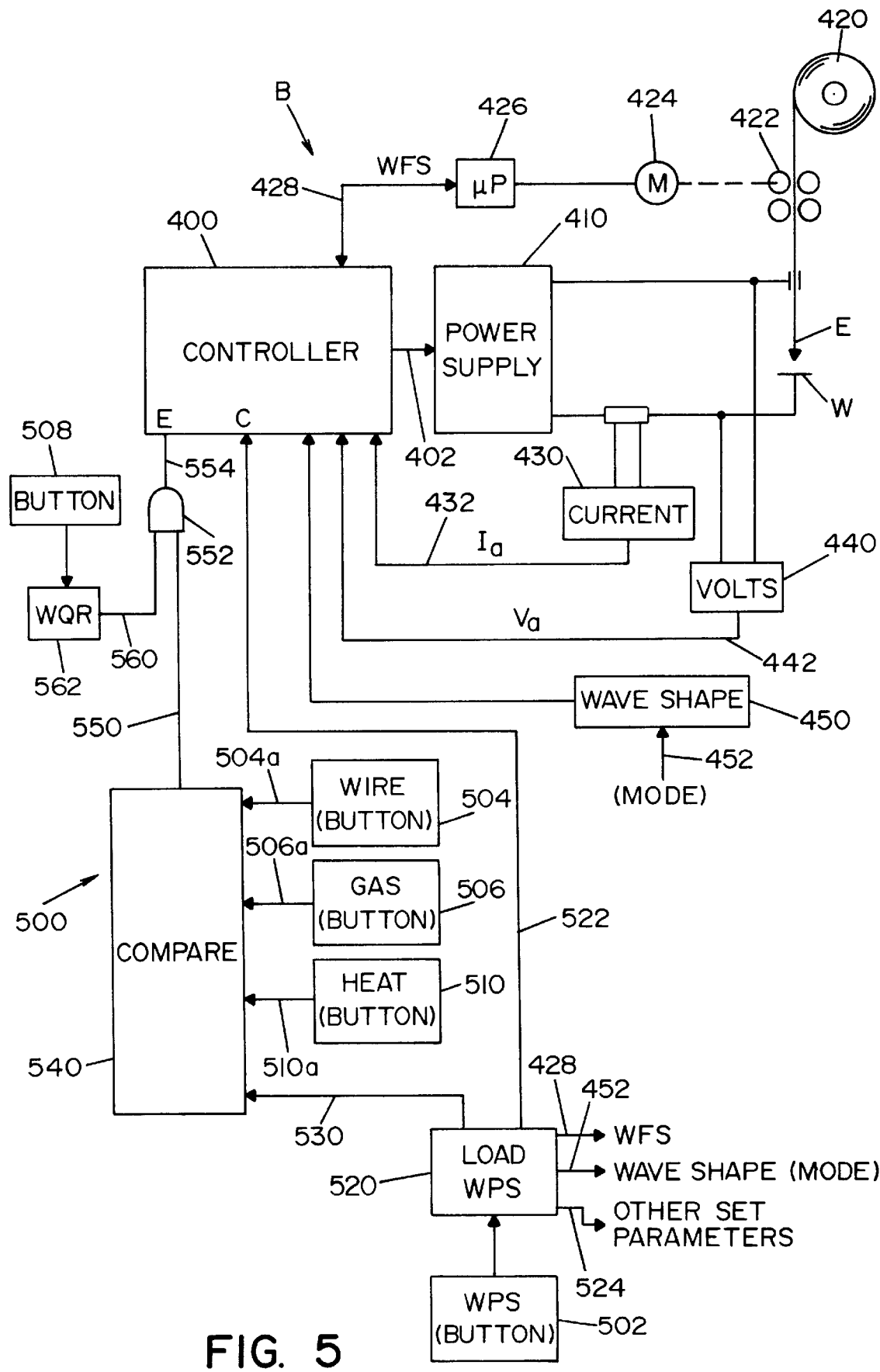
FIG. 5 is a block diagram and wiring diagram summarizing the primary aspects of the present invention.

The welder B shown in FIG. 5 has controller 400 for outputting a normal command signal 402 to operate power supply 410 for performing a welding process between electrode or wire E and workpiece W. The electrode is shown as a wire provided by spool 420 through rolls 422 driven by motor 424 in accordance with the outputs of microprocessor 426 as determined by the digital signal on line 428. In accordance with standard practice, current feedback 430 directs a voltage representing the current. This feedback signal $I_a$ appears on line 432. In a like manner, voltage feedback 440 directs a voltage on line 442 representing the output voltage $V_a$ across the arc of the welding operation. A wave shape generator 450 includes a mode select line 452 for directing the necessary current or voltage waveform to controller 400 for the operation of welder B. As so far described, welder B is somewhat standard and is controlled by a wave shape similar to the Power Wave welder sold by The Lincoln Electric Company of Cleveland, Ohio. To assure that the necessary welding procedure specification WPS is performed by welder B for a specific application, welder B is provided with novel network 500 including memory buttons 502, 504, 506, 508 and 510. These memory buttons are mounted in receptacles on a touch connector and include internal IC chips loaded with appropriate digital data as explained so far. The process to be performed by welder B is contained in the chip of button 502 which is received in a receptacle to load the digital data into memory 520. Memory 520 outputs the wire feed speed WFS on line 428 and the wave shape mode on line 452. The rest of the parameters are directed to controller 400 through line 524. In this manner, as long as the welder is capable of performing the process of button 502, necessary data is entered into the controller and/or the inputs for the wire feed speed and wave shape selector. Digital data in the chip of button 504 is directed through line 504a to disable circuit 540. In a like manner, the digital data for the shielding gas from button 506 is directed through line 506a to circuit 540. The necessary preheat or post heat is contained as digital data loaded into the chip of button 510. This information is directed to network or circuit 540 as indicated by line 510a. The data on lines 504a, 506a and 510a is compared with corresponding digital data directed to circuit 540 as indicated by line 530. If the digital data corresponds and is appropriate therefor to perform the WPS of button 502, an enable signal is directed by line 550 to gate 552 having an output 554 connected to the enable terminal of controller 400. Qualifications of the particular operator for welder B is contained on the chip of button 508. Thus, qualification information is directed by network 562 through line 560 as the second input of gate 552. Thus, if an appropriate operator is designated and the desired wire, gas and heat is being processed, controller 400 operates in accordance with the commands in line 522. Of course, the network is illustrated by logic diagrams; however, they are performed in practice as software processed by a digital processing device in accordance with standard welding technology.

In one aspect of the invention, the WFS is loaded into the logic at the enable portion of controller 400 and only memory buttons 504 and 506 are used. The rest of the WPS is assumed to be met. Also, the WPS can be loaded into the control logic with only button 508 being interrogated. Then the welder is operated normally, but an operator with the needed qualifications must insert his or her personal memory button into the proper receptacle to enable operation of the welder.

Figure 6:
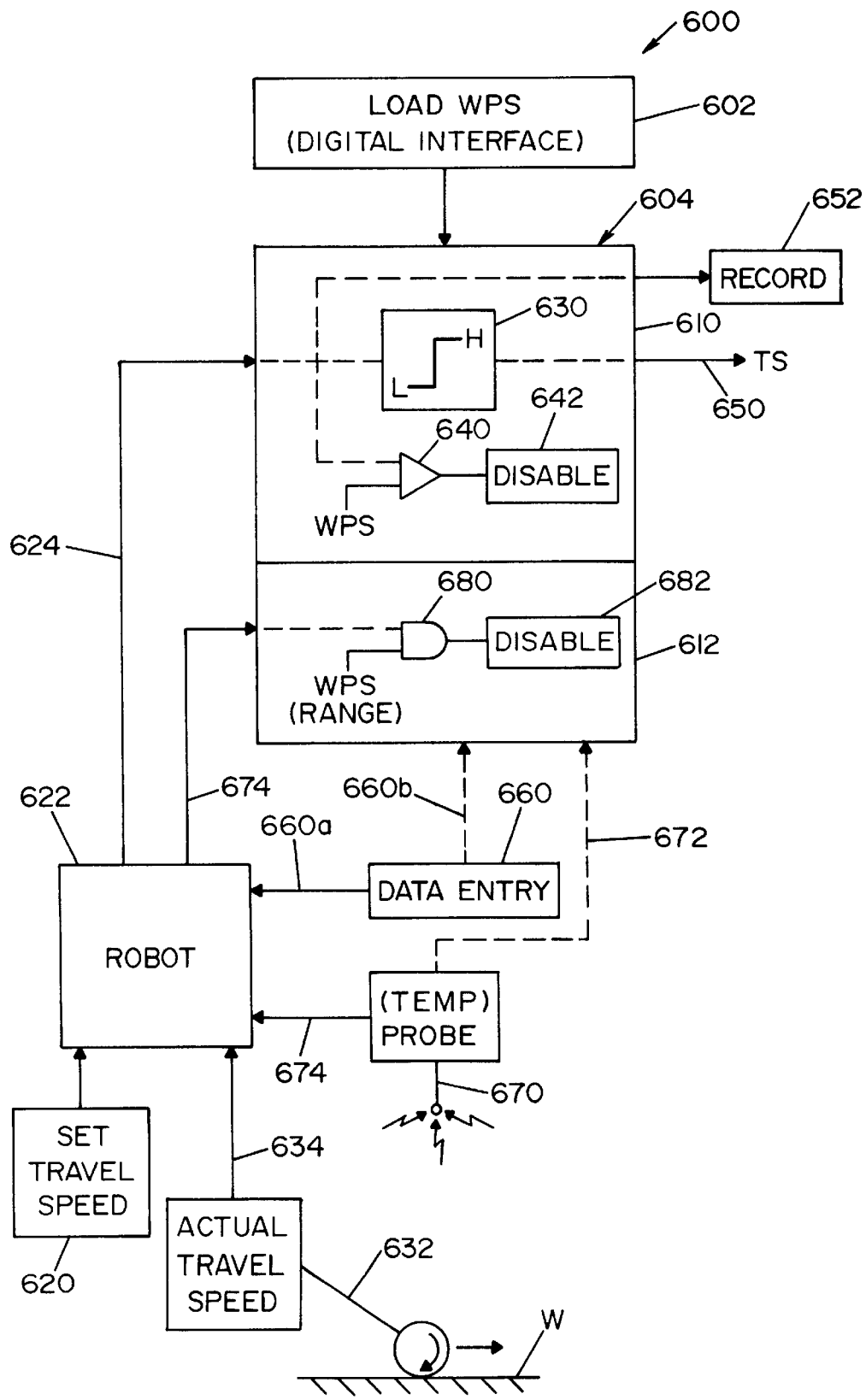
FIG. 6 is a block diagram and wiring diagram illustrating further aspects of the invention; and, FIG. 7 is a block diagram and wiring diagram of another aspecdt of the invention.

Further aspects of the invention are illustrated in FIG. 6 wherein control system 600 is associated with the commercial implementation shown in FIG. 4. As represented by block 602, a welding procedure specification is loaded by a digital interface into section 604 of the controller used by the welder. Section 604 uses logic such as networks 610, 612 for assuring that specific parameters of the loaded WPS are matched. These logic networks are representative. Network 610 is used to process a parameter set by a weldor, such as travel speed inputted at station 620 of robot 622 and communicated to network 610 as represented by line 624. The WPS has a travel rate that is to be limited between a high value and a low value represented by standard high/low circuit 630. The actual travel speed is measured by sensor 632 riding along workpiece W and is communicated to line 624 by way of line 634. Data corresponding to the weldor selected speed from station 620 and to the actual speed sensed by probe 632 are transmitted as digital information to network 610. If the selected speed is not proper, comparator 640 activates disable circuit 642 to disable the welder. As an alternative, if the selected speed is not proper, circuit 620 will limit the travel speed at control line 650 to a value between the set high and low values. As a further alternative for concurrent use, the actual feed speed from probe 632 will be recorded at block 652 for a history of the weld feed speed during a weld process. The feed speed can be communicated to section 604 by a data entry device 660. The data entry directs data to robot 622 by line 660a or directly to section 604 or network 612 by alternate line 660b. Another concept of the invention involves a probe 670 to detect an external condition, such as preheat of the workpiece or weld bead. The probed characteristic, such as temperature, is sensed by probe 670 which normally touches the workpiece or bead. The data is transmitted to section 604 as indicated by line 672 and/or to robot 622 by line 674. The sensed data is communicated directly to section 604 or network 612 by line 672. This data passes through robot 622 by line 674. The sensed data is process by logic, indicated as gate 680, to compare the sensed characteristics with a range forming a feature of the loaded WPS. If the characteristic is not within the WPS range, circuit 682 disables the welder. The logic and circuits shown in FIG. 6 are implemented by software in a digital processing device associated with the controller of the arc welder.

Figure 7:
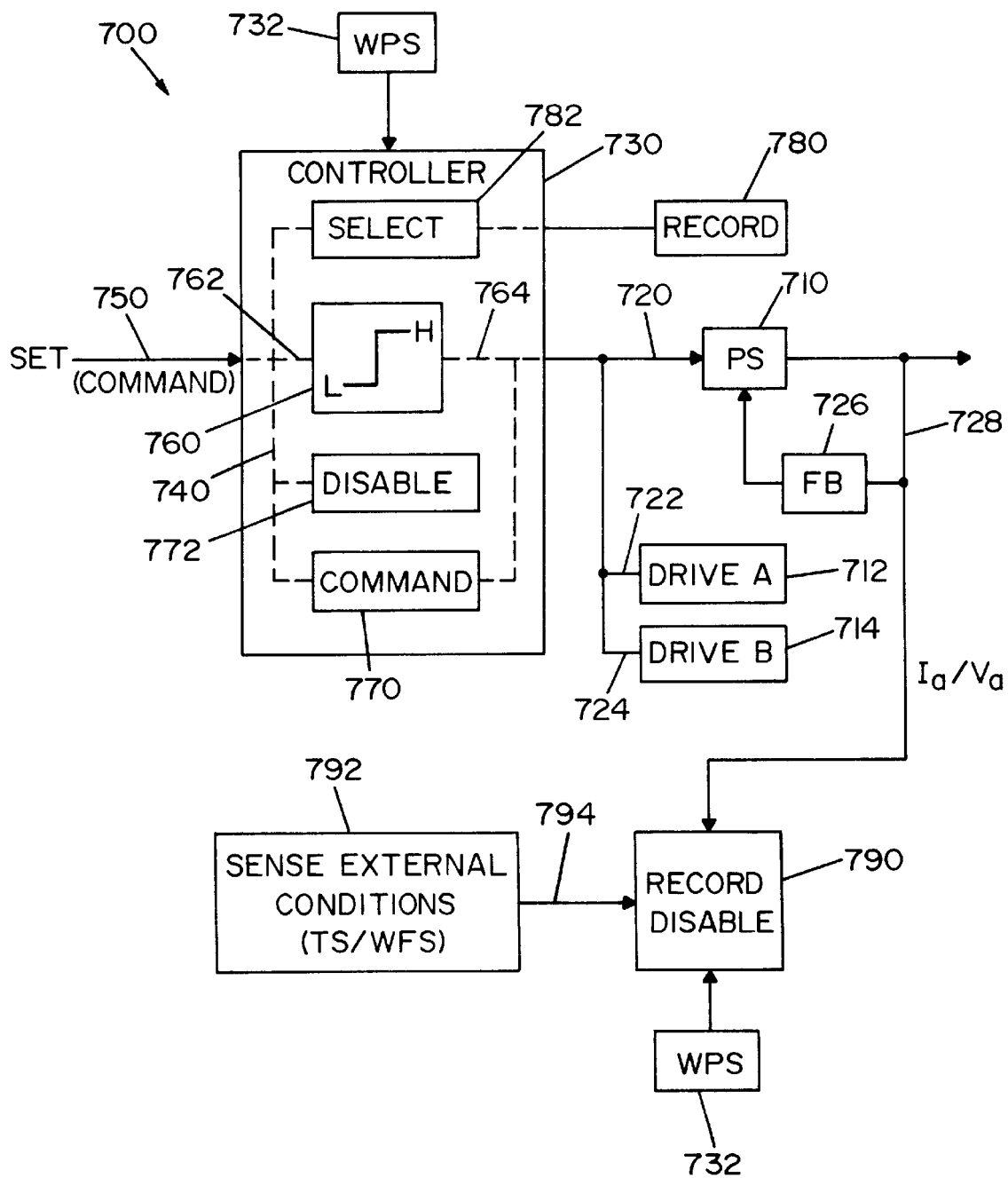

Another novel use of welding procedure specifications (WPS) is shown as control system 700 of FIG. 7. The weld station or robot utilizing system 700 includes a power supply 710 and external drive devices 712, 714. Drive A is for the wire feed speed and drive B is for the travel speed of the robot at the weld station. Power supply 710 receives command signal 720 from controller 730. The controller also creates command signal 722 for drive A and 724 for drive B. In accordance with standard practice, the power supply includes a feedback loop 726 for reading the output arc current and arc voltage as indicated by line 728. A section of the digital processing device of controller 730 is loaded with the welding procedure specification from storage or memory device 732. As illustrated, an aspect of the welding procedure specification (WPS) is the constraints for external conditions, such as arc current, arc voltage, wire feed speed and travel speed. The logic network 740 is representative process logic for data loaded from memory device 732. A logic network 740 is provided for each of the external conditions of the welding operation contained in the welding procedure specification. Only one of these logic networks is explained; however, it applies to various external conditions. An operator at the weld station selects the level of the external condition which set level is communicated to the logic network 740 in controller 730 as indicated by line 750. The command data on line 750 comes from a data entry station or from the robot as shown in FIG. 6. This selected set level is then processed by a logic network schematically shown as network 740. This network processes the data set on line 750 as previously described by employing a standard high/low circuit 760 by data on input line 762. In this section of network 740, the set level on line 750 is compared with a high and low level in the WPS. If the set level is too high, it is reduced to the high level in output line 764. In a like manner, if the selected set level is too low, it is increased to the low level of circuit 760. If the selected level on line 750 is appropriate under the WPS, it is merely passed through to line 764 through a command portion 770 of network 740. In the situation previously described, welder power supply 710 may be disabled when the selected set level on line 750 deviates from the level or value contained in memory device 732. This is indicated by disable circuit 772. If the set level on line 750 is controlled by circuit 760 or is merely passed through by circuit 770, network 740 is programmed to allow recording of the actual processed level. Block 780 is set to record the condition by select circuit 782 of logic network 740. Thus, the level on line 750 actuates logic network 740 to provide an action signal which either reduces the set level, passes the set level, or disables the welder. In instances where appropriate, the action signal also activates a recording operation for the particular external condition being processed. Of course, other logic networks could be used for implementing the welding procedure specification in accordance with the set level on line 750. As so far explained, command signals on lines 720, 722 and 724 instruct the power supply and the various drives in accordance with the corresponding parameters from the welding procedure specification in memory device 732.

During welding, the external conditions are sensed on a real time basis. The arc current and arc voltage are sensed and communicated to control block 790 by line 728. In a like manner, the sensed values of external conditions, such as travel speed and wire feed speed, are communicated to control block 790 from sensors 792 on line 794. If the system has been set to record for one or more of the external conditions, control block 790 records the real time values for external conditions for which block 780 has been selected. Control block 790 is in the section of controller 730 receiving data from memory device 732. As indicated before, the welding procedure specification (WPS) loaded from device 732 includes values for the various external conditions. A deviation such as the high and low values in circuit 760 can be tolerated. These same high and low levels for the external conditions are used by block 790 for comparison with the actual real time conditions from lines 728, 794. If the actual values are improper, control block 790 disables the power supply 710. Control system 700 is a further aspect of the present invention and is performed by software in controller 730 and/or by a program and data loaded into the controller through use of memory devices 732. In accordance with the preferred embodiment of the invention, memory device 732 is a memory button having a chip loaded with the digital data indicative of a specific welding procedure specification. The details of the software are set forth in the block diagram and can be varied to accomplish the desired operation for the novel method and system of the present invention.

The invention involves loading a welding procedure specification (WPS) into a section of the controller used to control the weld process at a weld station. The weld station preferably is a robot combined with the electric arc welder. By using the present invention, certain items in a welding procedure specification which are not met in the welding operation will disable the welder. In practice, these disabling items include the electrode specification, electrode classification, and electrode diameter of the wire. These items are loaded into the system by a memory button having a chip loaded with the data relating to the wire. A wrong wire disables the welder. The welder can be deactivated by an operator selecting the wrong welding process or the wrong electrical characteristics, such as polarity. These disabling items of the welding procedure specification are sensed by the controller. Data entry or external sensors also detect the joint type and the specification of the base metal. If either of these items do not conform with the welding procedure specification, the welder is disabled. As was the case with the memory button for the welding wire being used in the weld process, the shielding gas, by type and flow rate, is also loaded as data on a memory button. If this gas data is improper, the welder is disabled. As so far described, items of the welding procedure specification inputted to the controller either conform with the WPS or the error disables the welder. These items have been discussed in connection with several embodiments of the invention.

External conditions as explained in FIG. 7 may disable the welder if set improperly or are improper during the welding process. These external conditions are arc current, arc voltage, travel speed, and wire feed speed. An external condition, such as welding position, which is set by the operator and then sensed is also an external condition which must be adjusted to be within preselected limits. Travel speed and welding orientation are conditions and WPS items obtained from external sensors or feedback from the robot itself. As explained in connection with FIG. 6, an external sensor, usually of the touch type, reads the heat of the workpiece or the heat of a previously created welding bead. This is an external condition which can be processed by system 700 shown in FIG. 7. If the temperature of the workpiece is within the high and low level, the welding process can proceed. If it is beyond these limits, this may be recorded and the welding operation may be disabled. All of these operating features of various welding procedure specifications are loaded into the controller and processed to assure that the welding process is within the WPS. Of course, the specification need not include all of the attributes available in all welding procedure specifications. Other features not so far described could be incorporated in such specifications and processed in accordance with the present invention.

Having thus defined the invention, the following is claimed:

1. A system for enabling an electric arc welder adapted to perform various welding processes using weld parameters and a welding wire or electrode, said system comprising a first receptacle for a first memory button having a chip loaded with digital data indicative of a specific welding procedure specification constituting a set of at least weld parameters, a specific weld process, electrical characteristics, and selected welding wire features; a second receptacle for a second memory button having a chip loaded with digital data indicative of recorded features of welding wire or electrode used by said welder; and, a disable circuit to disable said welder to process said specific welding procedure when said data indicative of recorded features of said welding wire fails to correspond with said data indicative of said selected welding wire features.

2. A system as defined in claim 1 wherein said wire features are selected from the group consisting of diameter and material.

3. A system as defined in claim 2 wherein said electrical characteristics include AC, DC positive and DC negative and a disable circuit to disable said welder to process said specific welding procedure specification when said welder can not perform said electrical characteristic.

4. A system as defined in claim 3 wherein said weld parameters include arc current and disable circuit to process said specific welding procedure specification when said welder can not provide said arc current.

5. A system as defined in claim 2 wherein said specific weld process includes constant voltage and constant current and a disable circuit to disable said welder to process said specific welding procedure specification when said welder can not perform said specific weld process.

6. A system as defined in claim 5 wherein said electrical characteristics include AC, DC positive and DC negative and a disable circuit to disable said welder to process said specific welding procedure specification when said welder can not perform said electrical characteristic.

7. A system as defined in claim 2 wherein said weld parameters include arc current and disable circuit to process said specific welding procedure specification when said welder can not provide said arc current.

8. A system as defined in claim 7 wherein said specific weld process includes constant voltage and constant current and a disable circuit to disable said welder to process said specific welding procedure specification when said welder can not perform said specific weld process.

9. A system as defined in claim 8 wherein said electrical characteristics include AC, DC positive and DC negative and a disable circuit to disable said welder to process said specific welding procedure specification when said welder can not perform said electrical characteristic.

10. A system as defined in claim 1 wherein said weld parameters include arc current and disable circuit to process said specific welding procedure specification when said welder can not provide said arc current.

11. A system as defined in claim 10 wherein said electrical characteristics include AC, DC positive and DC negative and a disable circuit to disable said welder to process said specific welding procedure specification when said welder can not perform said electrical characteristic.

12. A system as defined in claim 11 wherein said wire features are selected from the group consisting of diameter and material.

13. A system as defined in claim 12 wherein said specific weld process includes constant voltage and constant current and a disable circuit to disable said welder to process said specific welding procedure specification when said welder can not perform said specific weld process.

14. A system as defined in claim 10 wherein said specific weld process includes constant voltage and constant current and a disable circuit to disable said welder to process said specific welding procedure specification when said welder can not perform said specific weld process.

15. A system as defined in claim 14 wherein said electrical characteristics include AC, DC positive and DC negative and a disable circuit to disable said welder to process said specific welding procedure specification when said welder can not perform said electrical characteristic.

16. A system as defined in claim 1 wherein said specific weld process includes constant voltage and constant current and a disable circuit to disable said welder to process said specific welding procedure specification when said welder can not perform said specific weld process.

17. A system as defined in claim 16 wherein said electrical characteristics include AC, DC positive and DC negative and a disable circuit to disable said welder to process said specific welding procedure specification when said welder can not perform said electrical characteristic.

18. A system as defined in claim 17 wherein said weld parameters include arc current and disable circuit to process said specific welding procedure specification when said welder can not provide said arc current.

19. A system as defined in claim 18 wherein said wire features are selected from the group consisting of diameter and material.

20. A system as defined in claim 1 wherein said electrical characteristics include AC, DC positive and DC negative and a disable circuit to disable said welder to process said specific welding procedure specification when said welder can not perform said electrical characteristic.

21. The system defined in claim 1 wherein said digital data of said first memory button is a code corresponding to said specific welding procedure specification.

22. The system as defined in claim 1 wherein said digital data of said first memory button contains said specific welding procedure specification.

23. The system as defined in claim 1 wherein said digital data of said second memory button is a code corresponding to said recorded features.

24. The system as defined in claim 1 wherein said digital data of said second memory button contains said recorded features.

25. The system as defined in claim 1 wherein said digital data of said first chip includes digital data defining selected qualification of the operating weldor and including a third receptacle for a third memory button having a chip loaded with digital data indicative of actual welding qualification of a weldor and a disables circuit disables said welder to process said welding procedure specification when said actual welding qualification fails to match and/or exceed said selected qualifications.

26. The system as defined in claim 25 including a program to update said digital data indicative of actual welding qualification in response to the processing of said specific welding procedure specification.

27. The system as defined in claim 1 wherein said digital data of said first chip includes data indicative of the selected shielding gas to be used in said weld procedure specification and including a third receptacle for a third memory button with digital data indicative of the actual shielding gas connected to said welder and a disable circuit to disable said welder to process said specific welding procedure when said actual shielding gas data fails to correspond with said data indicative of said selected shielding gas data.

28. A system for enabling an electric arc welder adapted to perform various welding processes using weld parameters and a welding wire or electrode, said system comprising a first receptacle for a first memory button having a chip loaded with digital data indicative of a specific welding procedure specification constituting a set of at least weld parameters, a specific weld process, electrical characteristics, and selected welding wire or electrode features; a second receptacle for a second memory button having a chip loaded with digital data indicative of an item in said set; and, a disable circuit to disable said welder to process said specific welding procedure when data indicative of said item fails to correspond with said data indicative of said item in said set.

29. A system as defined in claim 28 wherein said item is shielding gas.

30. A system as defined in claim 28 wherein said item is a feature of said wire or electrode.

31. A system as defined in claim 28 wherein said item is qualification of an operator.

32. A system as defined in claim 28 wherein said weld parameters include arc current and disable circuit to process said specific welding procedure specification when said welder can not provide said arc current.

33. A system as defined in claim 28 wherein said specific weld process includes constant voltage and constant current and a disable circuit to disable said welder to process said specific welding procedure specification when said welder can not perform said specific weld process.

34. A system as defined in claim 28 wherein said electrical characteristics include AC, DC positive and DC negative and a disable circuit to disable said welder to process said specific welding procedure specification when said welder can not perform said electrical characteristic.

35. The system defined in claim 28 wherein said digital data of said first memory button is a code corresponding to said specific welding procedure specification.

36. The system as defined in claim 28 wherein said digital data of said first memory button contains said specific welding procedure specification.

37. The system as defined in claim 28 wherein said digital data of said second memory button is a code corresponding to said data indicative of an item in said set.

38. The system as defined in claim 28 wherein said digital data of said second memory button contains data indicative of said item.

39. A system for enabling an electric arc welder adapted to perform various welding processes using weld parameters and a welding wire, said system comprising a first receptacle for a first memory button having a chip loaded with digital data indicative of a specific welding procedure specification and selected qualifications of the operating weldor; a second receptacle for a second memory button having a chip loaded with digital data indicative of the actual qualifications of a specific weldor; and, a disable circuit to disable said welder to process said specific welding procedure when data indicative of said actual qualifications fail to match and/or exceed said selected qualifications.

40. The system as defined in claim 39 wherein said digital data of said first chip includes selected qualification of the operating welder and including a third receptacle for a third memory button having a chip loaded with digital data indicative of actual welding qualification of a weldor and a disable circuit to disable said welder to process said welder procedure specifications when said actual welding qualification fails to match and/or exceed said selected qualifications.

41. A system for enabling an electric arc welder adapted to perform various welding processes using weld parameters and a welding wire or electrode, said system comprising a memory loaded with digital data indicative of a specific welding procedure specification constituting a set of at least weld parameters, a specific weld process, electrical characteristics, and selected welding wire or electrode features; a receptacle for a memory button having a chip loaded with digital data indicative of an item in said set; and, a disable circuit to disable said welder to process said specific welding procedure specification when data indicative of said item fails to correspond with said data indicative of said item in said set.

42. A system as defined in claim 41 wherein said item is shielding gas.

43. A system as defined in claim 41 wherein said item is a feature of said wire or electrode.

44. A system as defined in claim 41 wherein said item is qualification of an operator.

45. A system for enabling an electric arc welder having a controller adapted to perform various welding processes using weld parameters and a welding wire, said system comprising a first receptacle for a first memory button having a chip loaded with digital data indicative of a specific welding procedure specification constituting a set of at least weld parameters, a specific weld process, electrical characteristics, and selected welding wire features; and, a circuit for loading said welding procedure specification into controller of said welder to control operation of said welder wherein said digital data of said first chip includes digital data defining selected qualification of the operating weldor and including a second receptacle for a second memory button having a chip loaded with digital data indicative of actual welding qualification of a weldor; and, a disable circuit to disable said welder to process said welder procedure specification when said actual welding qualification fails to match and/or exceed said selected qualifications.

46. The system as defined in claim 45 including a program to update said digital data indicative of actual welding qualification in response to the processing of said specific welding procedure specification.

47. A system for controlling an electric arc welder, said system comprising a memory loaded with digital data indicative of a specific welding procedure specification constituting a set of weld parameters, a controller with a digital processing device having a memory for receiving said digital data and controlling said welder in compliance with said digital data, and a digital reading interface to load said digital data from said memory to said section of said controller, said system further including a receptacle for a memory button having a chip loaded with data indicative of an item in said set and a disable circuit to disable said welder when said specific welding procedure specification fails to correspond with said data indicative of said item in said set.

48. A system as defined in claim 47 wherein said item is shielding gas.

49. A system as defined in claim 47 wherein said item is a feature of said wire or electrode.

50. A system as defined in claim 47 wherein said item is qualification of an operator.

51. A system for controlling an electric arc welder, said system comprising a memory loaded with digital data indicative of a specific welding procedure specification constituting a set of weld parameters, a controller with a digital processing device having a memory for receiving said digital data and controlling said welder in compliance with said digital data, and a digital reading interface to load said digital data from said memory to said section of said controller wherein said set of parameters of said welding procedure specification includes a specific parameter to be externally selected by a weldor, a station where a weldor selects said specific parameter, a circuit for limiting said selected specific parameter, and a circuit to implement said specific parameter by said welder.

52. A system as defined in claim 51 wherein said limiting circuit limits the maximum value of said specific parameter.

53. A system as defined in claim 52 said limiting circuit limits the minimum value of said specific parameter.

54. A system as defined in claim 51 wherein said limiting circuit limits the minimum value of said specific parameter.

55. A system as defined in claim 54 wherein said station is a data entry device.

56. A system as defined in claim 51 wherein said station is a data entry device.

57. A system for controlling an electric arc welder, said system comprising a memory loaded with digital data indicative of a specific welding procedure specification constituting a set of weld parameters, a controller with a digital processing device having a memory for receiving said digital data and controlling said welder in compliance with said digital data, and a digital reading interface to load said digital data from said memory to said section of said controller wherein said memory device is a memory button having an IC chip loaded with said digital data and readable by touch and said interface is a touch contactor in a receptacle to touch said memory button when said button is placed into said receptacle and wherein said set of parameters of said welding procedure specification includes a specific parameter to be externally selected by a weldor, a station where a weldor selects said specific parameter, a circuit for limiting said selected specific parameter, and a circuit to implement said specific parameter by said welder.

58. A system as defined in claim 57 wherein said limiting circuit limits the maximum value of said specific parameter.

59. A system as defined in claim 57 wherein said limiting circuit limits the minimum value of said specific parameter.

60. A system for controlling an electric arc welder, said system comprising a memory loaded with digital data indicative of a specific welding procedure specification constituting a set of weld parameters, a controller with a digital processing device having a memory for receiving said digital data and controlling said welder in compliance with said digital data, and a digital reading interface to load said digital data from said memory to said section of said controller wherein said set of parameters of said welding procedure specification includes a specific parameter relating to a characteristic of an external condition, an external probe for sensing said characteristic of said external condition and a circuit for disabling said welder when said characteristic is outside limits placed on said characteristic by said loaded welding procedure specification.

61. A system as defined in claim 60 wherein said characteristic is temperature.

* * * * *